J. LEND.
VEHICLE TIRE.
APPLICATION FILED NOV. 17, 1906.

919,603.

Patented Apr. 27, 1909.
2 SHEETS—SHEET 2.

WITNESSES:
Geo. T. Clark
Paul A. Viersen

INVENTOR
John Lend.
BY
John L. Kindt.
ATTORNEY

UNITED STATES PATENT OFFICE.

JOHN LEND, OF CHICAGO, ILLINOIS, ASSIGNOR OF ONE-HALF TO JOHN JAMIESON, OF CHICAGO, ILLINOIS.

VEHICLE-TIRE.

No. 919,603.  Specification of Letters Patent.  Patented April 27, 1909.

Application filed November 17, 1906. Serial No. 343,888.

*To all whom it may concern:*

Be it known that I, JOHN LEND, of the city of Chicago, county of Cook, and State of Illinois, have invented a new and useful Improvement in Vehicle-Tires, of which the following is a specification.

This invention relates to vehicle tires, which are particularly adapted for use on automobile or bicycle wheels, but which may also be used on any kind of a vehicle wheel where considerable resiliency is desired, such as buggies, carriages, and the like.

The object of the invention is to provide a tire which is adapted to be secured to a vehicle wheel. This tire is provided with a plurality of springs circumferentially arranged on the outer surface of the tire, and yieldably supporting a plurality of shoes, all of which being inclosed with a flexible covering of rubber or other like material. This gives a high degree of resiliency when the wheel is in motion and obviates the necessity of using the expensive tires of pneumatic type in order to obtain the desired resiliency.

Figure 1:
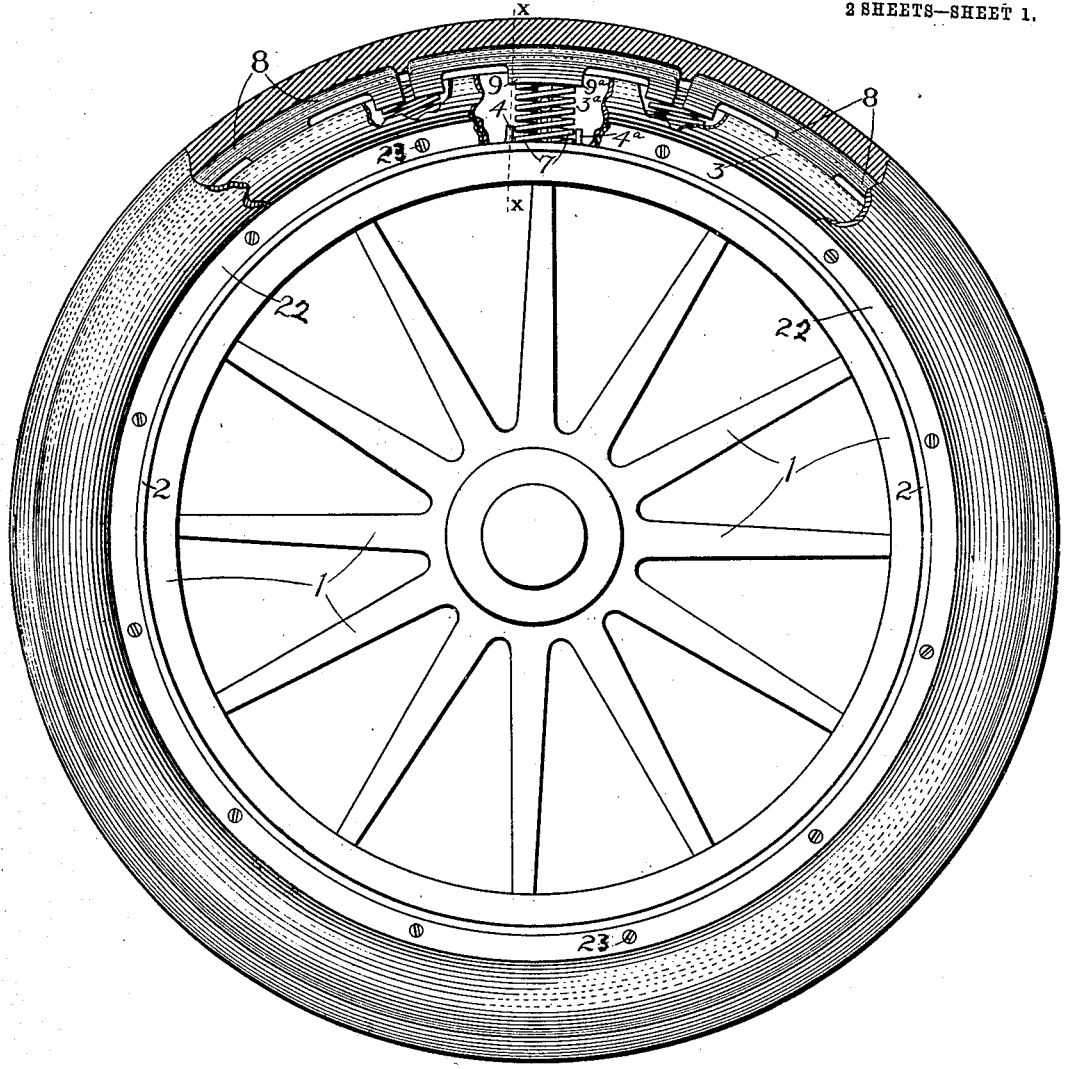
Figure 2:
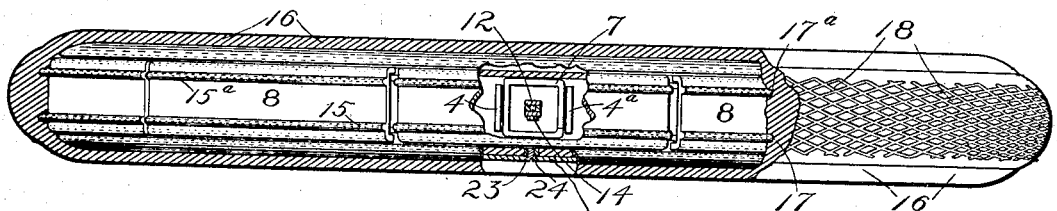
Figure 3:
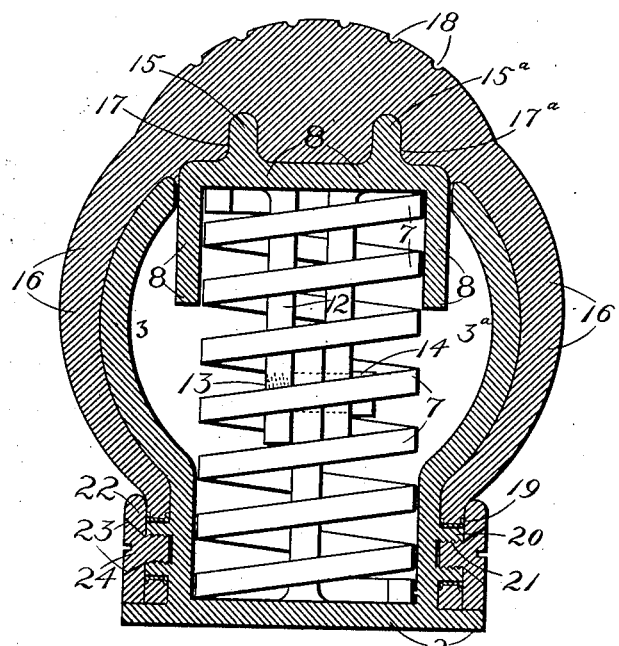
Figure 4:
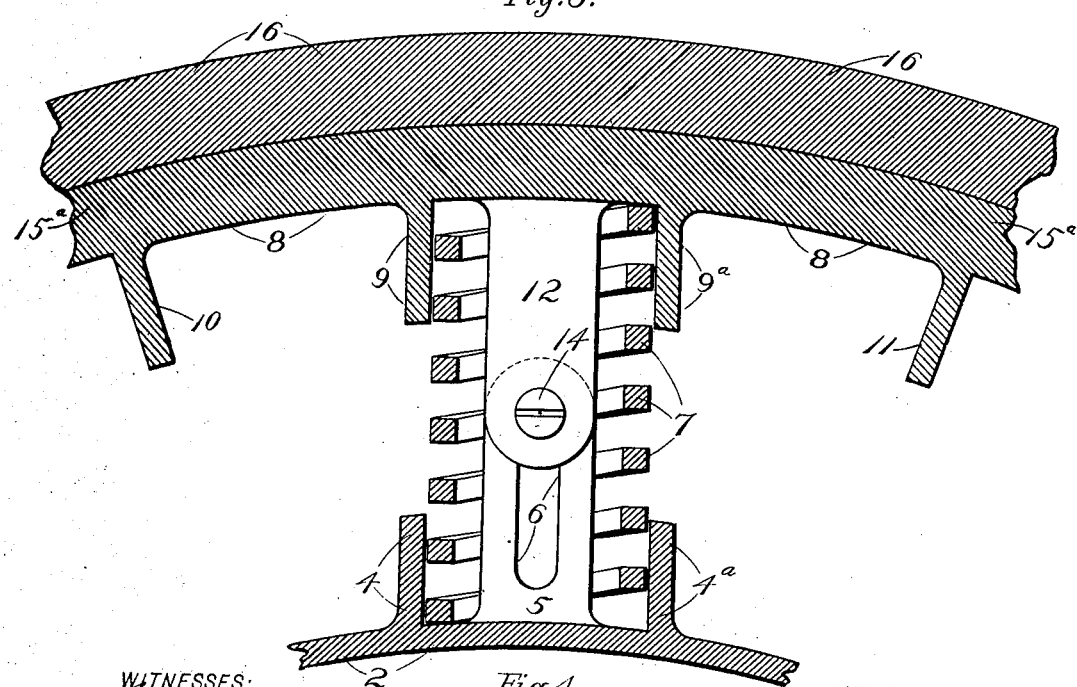

Figure 1 is a side elevation of my improved vehicle tire, partly in section; Fig. 2 is a top plan in section; Fig. 3 is a cross section in elevation taken on line $x$ $x$ of Fig. 1; and Fig. 4 is a longitudinal section in elevation.

In the accompanying drawings the reference numeral 1 indicates the vehicle wheel to which is secured the tire 2. Walls 3 and 3ª are circumferentially disposed on the outer surface of the tire 2 and formed integral therewith. Disposed at predetermined intervals on the surface of the tire 2, between the walls 3 and 3ª are the lugs 4 and 4ª. The purpose of these lugs is to form a seat for the reception of the spring which will be hereafter described. Standards 5 are also formed on the outer surface of the tire 2, these standards are disposed between the lugs 4 and 4ª, and are provided with the longitudinal slot 6. A spring 7 is adapted to encircle standard 5 and rest in the seat formed by the lugs 4 and 4ª.

The shoe 8 has formed on its under surface, and intermediate the ends thereof the projections 9 and 9ª, and on each end of said shoe are the downwardly extending projections 10 and 11. The projections 9 and 9ª form a seat which receives the upper end of spring 7 when the shoe 8 is secured in position thereupon. Intermediate of the seat formed by the projections 9 and 9ª is secured a slotted extension 12, the lower end of this extension is provided with opening 13. When the shoe 8 is placed in position on the spring 7, the standard 5 will pass into the slotted portion of extension 12, a bolt 14 is passed through opening 13, and through slot 6 into standard 5. When spring 7 is in position the standard 5 and slotted extension 12 will be in their extended position by reason of the pressure of said spring, which will readily yield when pressure is exerted against the outer surface of the shoe 8.

As here shown, the center of shoe 8 rests directly over one end of spring 7, and each end thereof rests upon one-half of the upper surface of the springs 7 disposed on either side of the spring located intermediate of the shoe 8. When a plurality of shoes 8 are secured in position as heretofore described, the projections 10 and 11 on the ends of each shoe will form a seat for one of the springs 7. Ribs 15 and 15ª are formed on the upper surface of shoe 8. A rubber casing is adapted to inclose the walls 3 and 3ª and the shoes 8, the inner surface of the casing 16 is provided with parallel grooves 17 and 17ª which receive the ribs 15 and 15ª. The tread of the casing 16 is provided with nurls 18. The ends of said casing 16 are provided with a plurality of openings 19 through which extend the studs 20, formed on the lower end of the walls 3 and 3ª, these ends are provided with openings 21 which are provided with internal screw threads. A ring 22, provided with the openings 23 is adapted to be secured to the studs 20 by means of screws 24, thus securely holding the casing 16 in position on the tire 2.

It will be understood that I do not wish to limit myself to the form of springs here shown, but that any form of a spring may be used which will provide the desired resiliency, hence I do not wish to be limited to the exact construction and arrangement of the springs as herein shown and described.

What I claim as new and desire to secure by Letters Patent, is—

1. In a device of the class described the combination with a rim, of walls integral therewith extending vertically outwardly for a short distance and then concaved to the outer extremities, lugs integral with the rim forming recesses, springs, one seated at one end in each recess, shoes fitting between the outer ends of the concaved walls and conforming to the curvature of the rim, inwardly directed lugs integral with the middle of the shoes forming recesses, lugs, one at each end of each shoe adapted together with the end lugs of adjacent shoes to provide recesses to receive the outer ends of part of the springs therein and the outer ends of the remainder of the springs seated in the middle recesses in the shoes and a casing covering the shoes and engaged around the concave and vertical walls of the rim.

2. In a device of the class described the combination with a rim provided with recesses at suitable intervals apart, springs seated therein, shoes spaced a distance from the rim and conforming to the curvature of the rim, each shoe provided with a central recess to receive the outer end of one of said springs therein, means at each end of each shoe coacting with the adjacent shoes to engage one of the aforesaid springs therein, a casing provided with grooves in the inner side of the tread adapted to engage over the shoes and ribs integral with the outer sides of the shoes adapted to engage in said grooves.

3. In a device of the class described a rim, short, outwardly directed, vertical walls integral therewith, concaved walls integral with the vertical walls, a casing engaged over the walls, means clamping the ends of the casing to the vertical walls, shoes within the casing, flanges integral therewith engaging in the tread of the casing, and coiled springs, part of the same engaged between the central portion of the shoes and the rim and part of the springs engaged between the ends of the shoes and rim.

4. In a device of the class described the combination with a rim, a casing secured thereto, provided with inner circumferential grooves, shoes within the casing conforming to the curvature of the tread, longitudinal ribs thereon fitting in said grooves, standards secured to the rim and centrally to the shoes, the standards secured to the rim having slots therein and means on the standards secured to the shoes for engaging in the slots in the respective rim standards, coiled springs around the standards forcing the shoes outwardly, springs engaged between the ends of adjacent shoes and the rim and circular plates for clamping the ends of the casing to the rim.

In testimony whereof I have signed my name in the presence of two subscribing witnesses.

JOHN LEND.

Witnesses:
  GEO. T. CLARK,
  PAUL A. VIERSEN.